United States Patent [19]
Harvey

[11] 3,993,149
[45] Nov. 23, 1976

[54] SCALE SYSTEM
[76] Inventor: John E. Harvey, Rte. 4, Mount Gilead Road, Decatur, Ill. 62521
[22] Filed: Aug. 20, 1975
[21] Appl. No.: 606,021

[52] U.S. Cl. .............................. 177/163; 177/183; 177/202; 73/141 R
[51] Int. Cl.² ................. G01G 21/22; G01G 21/02; G01G 1/18; G01L 5/12
[58] Field of Search ........... 177/145, 151, 154, 163, 177/183, 201, 202, 244; 73/141 R

[56] References Cited
UNITED STATES PATENTS
3,406,771   10/1968   Rogers ............................ 177/163 X
3,780,818   12/1973   Lumby et al. ...................... 177/256
FOREIGN PATENTS OR APPLICATIONS
581,929    10/1946   United Kingdom ................. 177/201

Primary Examiner—George H. Miller, Jr.
Attorney, Agent, or Firm—Schuyler, Birch, Swindler, McKie & Beckett

[57] ABSTRACT

A scale system including a vertically displaceable crown supported by a longitudinally displaceable center section. A sensing means disposed above-ground is actuated by the center section in response to a weight applied to the crown. The sensing means sends a signal to an interpreting means. Inclined, mating surfaces interconnect the crown and the center section so that the crown is displaceable substantially vertically only and the center section is displaceable substantially longitudinally only. Alternative embodiments of the invention include a friction-reducing material for the inclined surfaces to render the coefficient of friction therebetween substantially a constant; a sealing means for the inclined surfaces to prevent deterioration thereof; restraining means for the center section to impede the displacement of the center section and prevent overload of the sensing means; and a locking means to prevent removal of the crown from the center section.

53 Claims, 9 Drawing Figures

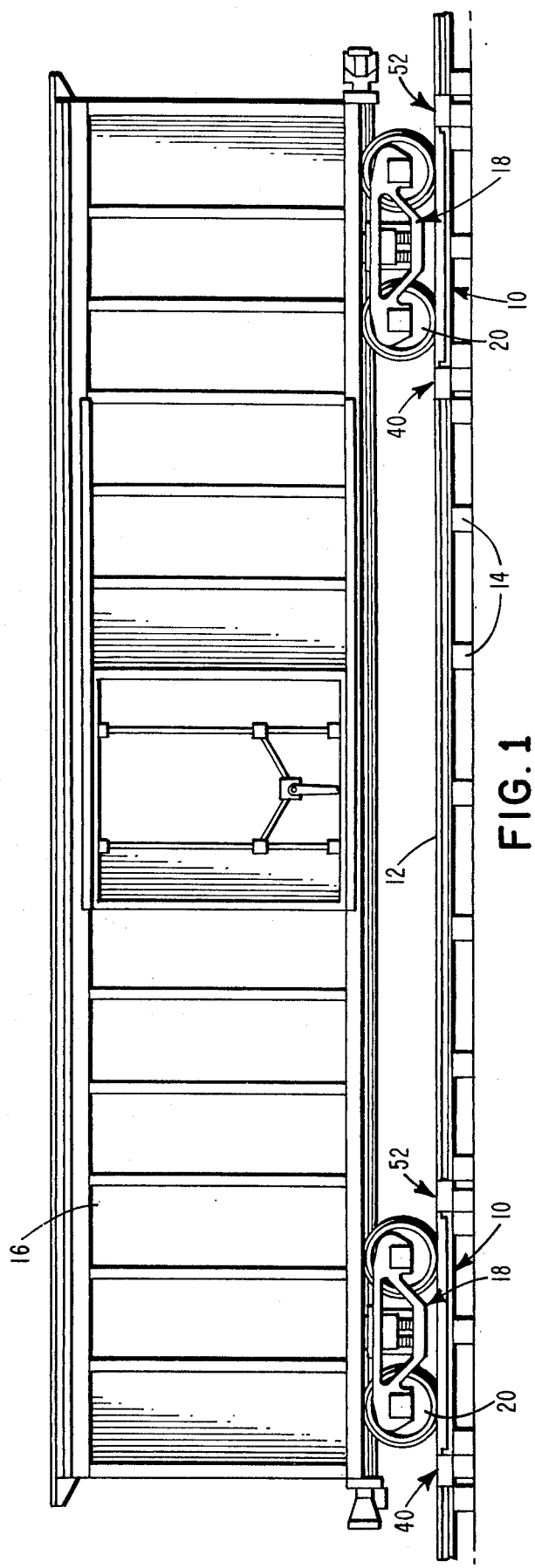
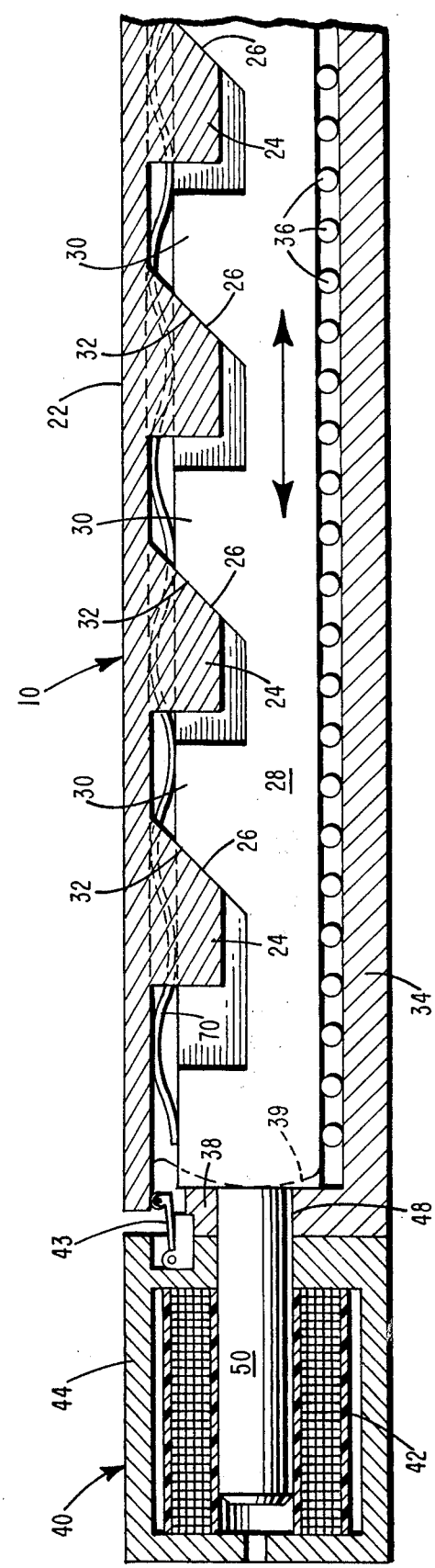
FIG. 1
FIG. 2A

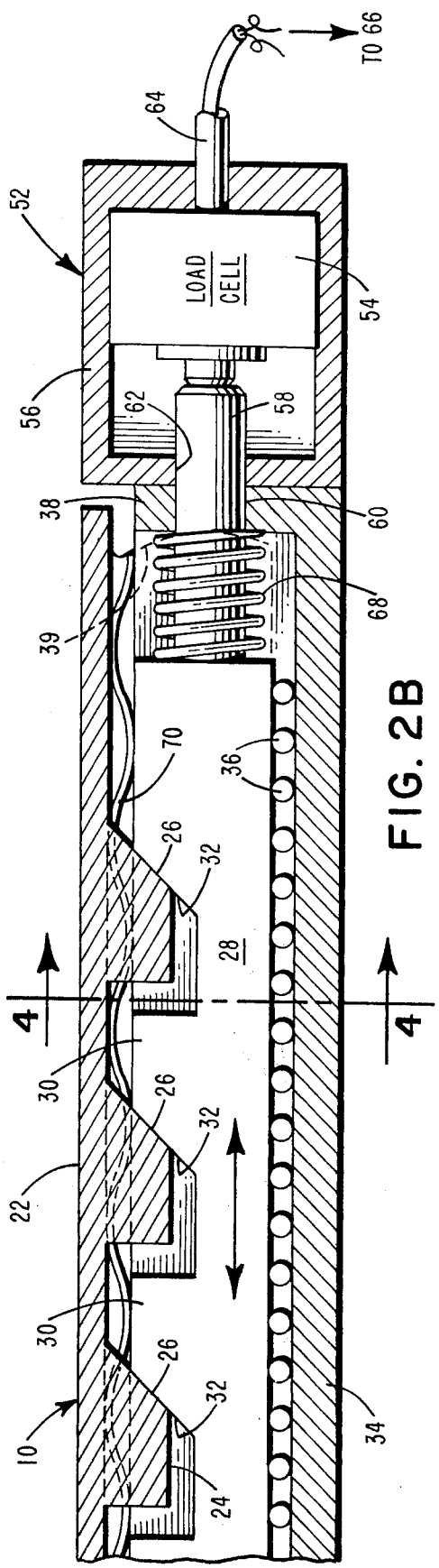
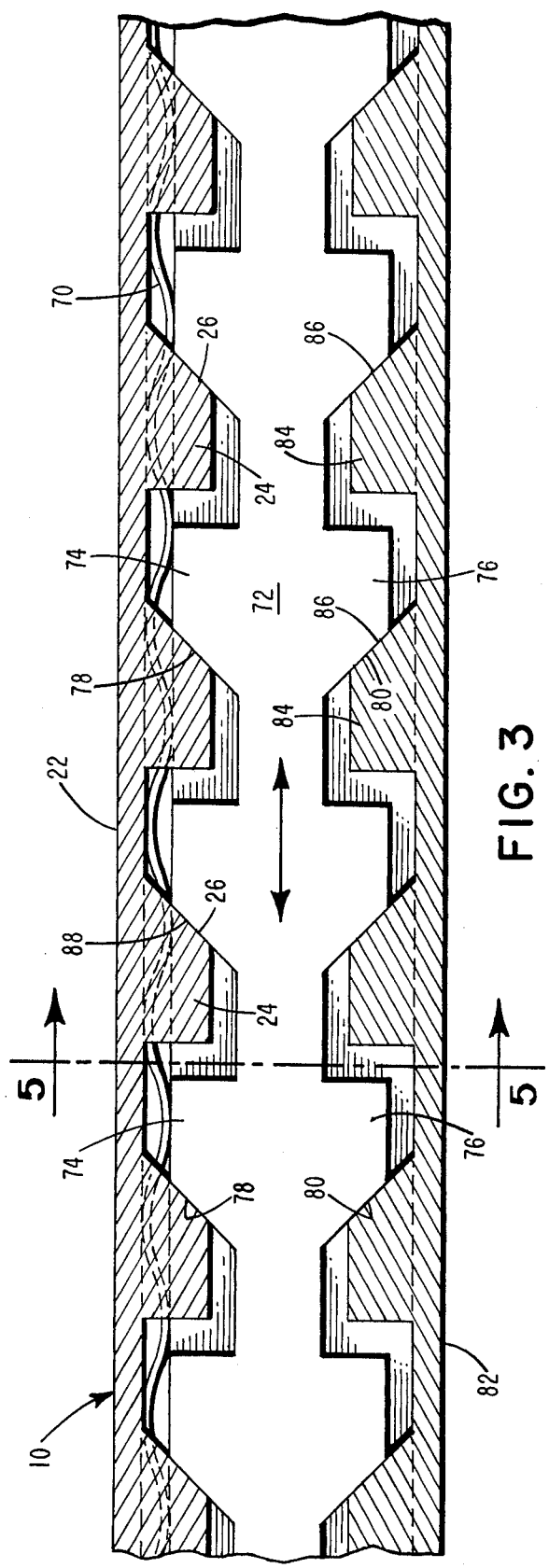
FIG. 2B
FIG. 3

SCALE SYSTEM

BACKGROUND OF THE INVENTION

1. Field of the Invention

The invention relates to weighing systems and, more particularly, to a method and apparatus for weighing vehicles wherein all of the apparatus is above-ground.

2. Description of Prior Art

In the vehicle weighing art, a conventional scale comprises a track or platform disposed at ground level having an underlying support structure buried in the earth. The support structure commonly includes load cells or interconnected levers and beams operating in response to a weight applied to the track or platform, and, in turn, operatively connected to an interpreting means to indicate the weight applied to the track or platform. The cost of such an installation is very great, often running into the hundreds of thousands of dollars, due in no small part to the excavation which must be provided for the weighing and support structure. If a large vehicle, such as a railroad car, is to be weighed, the installation cost is increased because a separate weighing system must be provided for each set of wheels of the car. Alternatively, a single, large platform is required sufficient to support the entire vehicle. Should the system ever malfunction, the time and expense necessary to repair the system can be very great because most of the components are below-ground, thus requiring considerable effort merely to have access to the components.

Also, conventional scales must be built on level ground and cannot operate promptly if the track is curved. These limitations restrict the places where a scale can be installed and often result in the scale being located a considerable distance from the point of loading.

Accordingly, it is an object of the invention to provide a new and improved scale system wherein all of the components are disposed above-ground.

It is another object of the invention to provide a new and improved scale system wherein installation costs are reduced to a minimum.

It is a still further object of the invention to provide a new and improved scale system wherein access to the components of the system may be had readily, thus minimizing the cost of repairs or replacement.

It is yet another object of the invention to provide a new and improved scale system which may be installed on nonlevel ground or where the track is curved.

SUMMARY OF THE INVENTION

In carrying out the invention to attain the foregoing and other objects, in one form thereof, a scale system includes a vertically displaceable crown supported by a longitudinally displaceable center section. A sensing means disposed above-ground is actuated by the center section in response to a weight applied to the crown. The sensing means sends a signal to an interpreting means. Inclined, mating surfaces interconnect the crown and the center section so that the crown is displaceable substantially vertically only and the center section is displaceable substantially longitudinally only. Alternative embodiments of the invention include a friction-reducing material for the inclined surfaces to render the coefficient of friction therebetween substantially a constant: a sealing means for the inclined surfaces to prevent deterioration thereof; restraining means for the center section to impede the displacement of the center section and prevent overload of the sensing means; and a locking means to prevent removal of the crown from the center section.

BRIEF DESCRIPTION OF THE DRAWINGS

FIG. 1 is a side elevational view of one form of a scale system according to the invention, showing a railroad car in the process of being weighed.

FIG. 2A is a cross-sectional view of a portion of one form of the invention, i.e. a rail, showing the crown, center section, and two forms of restraining means.

FIG. 2B is a view similar to FIG. 2A depicting another portion of the scale system and showing a typical sensing means operatively connected to the center section and additionally showing another form of restraining means.

FIG. 3 is a cross-sectional view of another form of the invention showing a modified center section and bottom section.

DESCRIPTION OF THE PREFERRED EMBODIMENT

Figure 5:
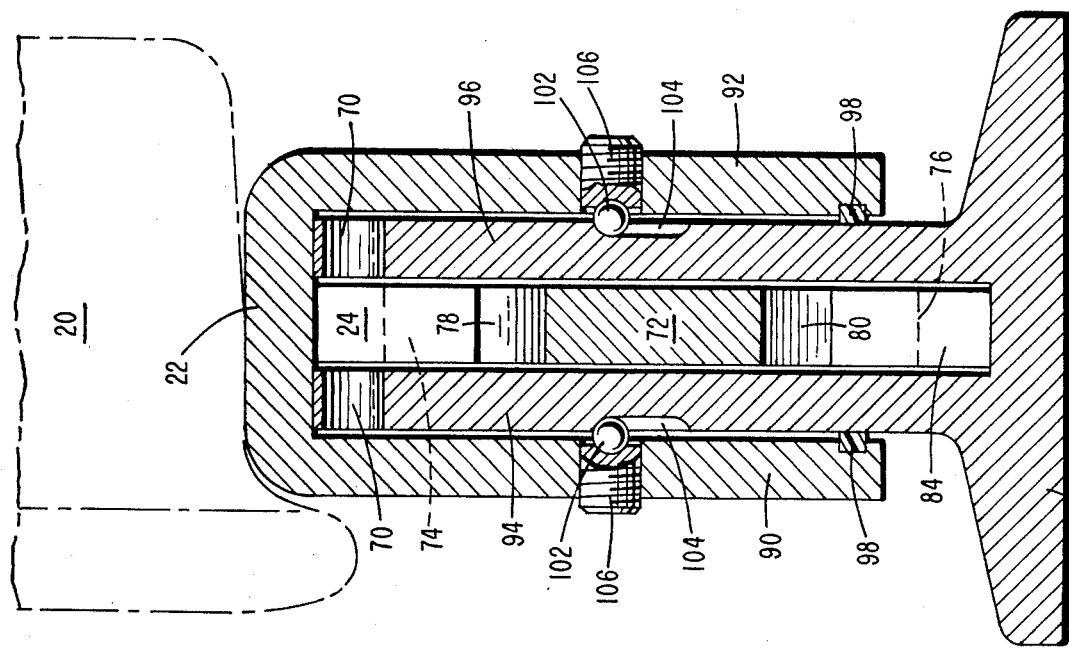
FIG. 5 is a view taken along line 5—5 of FIG. 3 and showing the sealing means for the inclined surfaces and the locking means for the crown.

FIG. 1 shows a scale system 10 according to the invention installed as part of a conventional railroad track 12, supported by ties 14. The structure and advantages of the invention are particularly well-suited for use in weighing railroad cars, and this it will be described in such an environment. However, it is to be understood that the invention is equally well-suited for weighing trucks, and like vehicles.

Scale system 10 is shown in the process of weighing a conventional railroad car 16. Car 16 includes four, two-axle trucks 18 of conventional design. Wheels 20 are identical and conform to commonly accepted standards. Since the average wheel base of a standard two-axle truck on a railroad car is five feet, ten inches, scale system 10 must be at least that long to accommodate each two-axle truck. Accordingly, each scale system 10 is approximately eight feet long to insure minimum difficulty in weighing a given railroad car. Additionally, each scale system 10 is appropriately spaced (as in FIG. 1) so that each two-axle truck is on a separate scale system at the same time.

Scale system 10 is installed conveniently merely by removing a section of existing rail and installing the scale system in its place. Scale system 10 is appropriately sized so that the original fittings employed to hold the previous rail in place also may be employed to hold scale system 10 in place. This, of course, contributes to the minimal time and expense necessary to install each scale system.

In the FIG. 2A embodiment scale portion 10 comprises a crown 22 having a plurality of projecting portions 24. Each projecting portion 24 includes a downwardly facing, inclined surface 26. Crown 22 is supported by a center section 28, which center section includes a plurality of projecting portions 30. Each projecting portion 30 comprises an upwardly facing, inclined surface 32, which inclined surface 32 mates with a corresponding downwardly facing, inclined surface 26 of projecting portion 24.

Crown 22 and center section 28 are supported by a stationary bottom section 34. A plurality of bearing members 36 are disposed intermediate center section 28 and bottom section 34 to permit relative longitudinal motion between center section 28 and bottom section 34. Bearing members 36 may be of any well-known type, but caged roller bearings are preferred. Bottom section 34 additionally includes an end section 38 disposed at each end of bottom section 34.

It will be apparent from an examination of FIG. 2A that, upon vertical displacement of crown 22, center section 28 will be longitudinally displaced to the right. The magnitude of the longitudinal displacement of center section 28 is a function of the angle of the inclined surfaces with respect to the horizontal. Although a 45° angle is illustrated, any convenient angle such as from 45° to 70° may be employed, depending on the weight of the vehicle to be weighed, the vertical displacement of the crown which can be tolerated, and the type of sensing means employed, among others. To prevent longitudinal displacement of crown 22, crown 22 includes a pair of depending flanges having end portions 39, which end portions engage end section 38. By this construction, crown 22 is capable of substantially vertical displacement only and center section 28 is capable of substantially horizontal displacement only.

Scale system 10 also includes a restraining means 40. As illustrated in FIG. 2A, restraining means 40 comprises an electromagnet 42 disposed within a generally rectangular housing 44. Housing 44 conforms to the shape of crown 22 at its top and includes an opening 46 in substantial alignment with an opening 48 in end section 38. Center section 28 includes an extended portion 50, which extended portion extends through openings 46 and 48 and into the interior of electromagnet 42. Electromagnet 42 is energized by a switch 43 affixed to housing 44 and operatively connected to crown 22. Switch 43 is opened and closed upon displacement of crown 22. Upon energization of electromagnet 42 (by switch 43 and conventional circuitry not illustrated), electromagnet 42 restrains the displacement of extended portion 50. In turn, the displacement of center section 28 is restrained for a purpose to be described hereafter.

Figure 7:
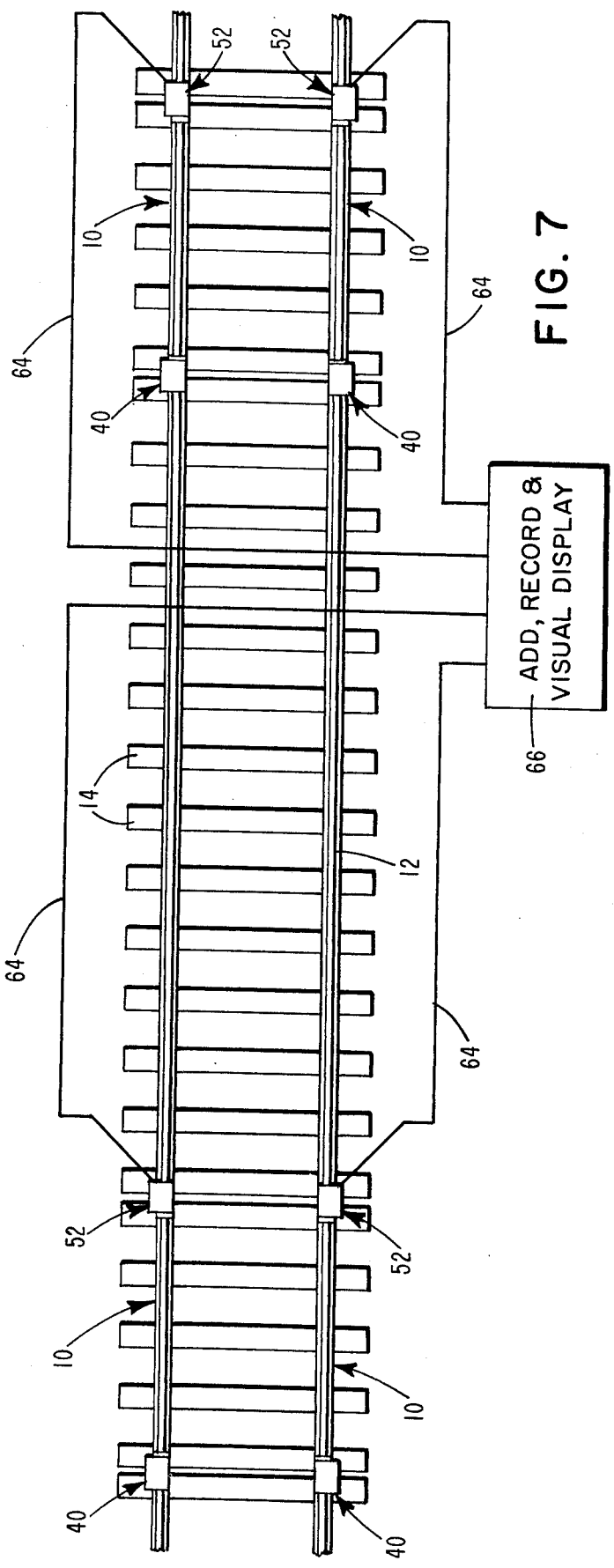
FIG. 7 is a plan view of the scale system installed as part of a conventional railroad track.

The other end of scale system 10 is illustrated in FIG. 2B. Where appropriate, the same reference numerals are used throughout with respect to like parts. A sensing means 52 is included as part of scale system 10. Sensing means 52 comprises a load cell 54 of conventional design disposed within a generally rectangular housing 56. As with housing 44, housing 56 conforms at its top to the shape of crown 22. In order for load cell 54 to sense the displacement of center section 28, center section 28 includes an extended portion 58 extending through openings 60 and 62 in end section 38 and housing 56, respectively. Upon displacement of center section 28, load cell 54 senses that displacement and sends appropriate signals through line 64 to an interpreting means 66 (FIG. 7).

Two alternative restraining means also are shown in FIG. 2B. One embodiment comprises a coil spring 68 disposed intermediate center section 28 and end section 38. In order to retain spring 68 in place, spring 68 is fitted over extended portion 58. Another type of restraining means comprises leaf spring 70. Leaf spring 70 is disposed intermediate a portion of crown 22 and an upstanding flange of bottom section 34. All of the restraining means described herein are employed to prevent the overloading of the sensing means and to return the center section to its initial position. Accordingly, the degree of restraint required is dependent upon the type of sensing means employed and the speed with which the weighing operations are to be conducted, among other things.

An alternative embodiment of scale system 10 is shown in FIG. 3. As in the first-mentioned embodiment, scale system 10 comprises a crown 22 having projecting portions 24 with inclined surfaces 26. Unlike the first embodiment, however, the center section and bottom section are modified. Center section 72 comprises projecting portions 74 and 76, each of portions 74 including upwardly facing, inclined surface 78 and each of portions 76 including downwardly facing, inclined surface 80. Bottom section 82 includes a plurality of projecting portions 84, each having an upwardly facing, inclined surface 86 mating with a corresponding surface 80 of projecting portion 76. Bottom section 82 is rigidly affixed to the roadbed so that it is stationary. It will be apparent that, upon vertical displacement of crown 22, center section 72 will be displaced substantially longitudinally only to the right. Each end of the scale system 10 illustrated in FIG. 3 is identical in all respects with the scale system illustrated in FIGS. 1, 2A, and 2B. In each embodiment, restraining means 40, 68, or 70, or any combination thereof, may be employed.

In order to provide uniform weight readings, it is imperative that the mating, inclined surfaces maintain a substantially constant coefficient of friction under all operating conditions. Therefore, each inclined surface may be coated with a friction-reducing material 88. A preferred friction-reducing material is polytetrafluoroethylene (Teflon), although any number of friction-reducing materials such as graphite or stearic acid may be employed. The use of a given friction-reducing material is considered optional, although the accuracy of readings is likely to increase with the use of such a material and the life of the inclined surfaces is extended.

Figure 4:
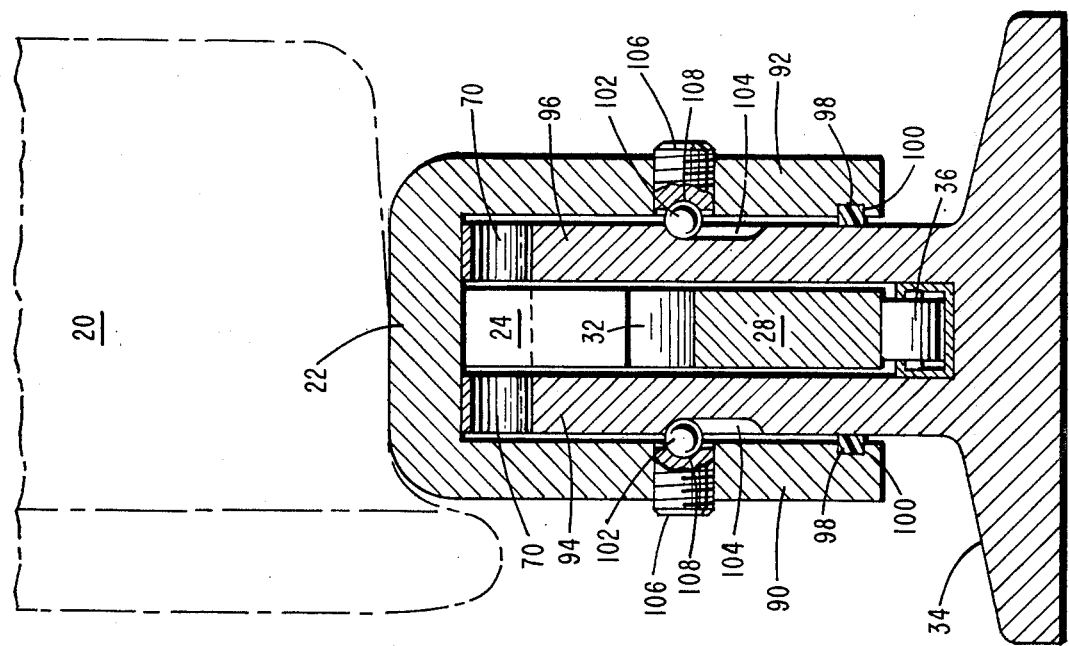
FIG. 4 is a cross-sectional view taken along line 4—4 of FIG. 2B and showing the sealing means for the inclined surfaces and the locking means for the crown.

Scale system 10 includes a sealing means for the inclined surfaces and a locking means to prevent removal of the crown from the center section. Referring to FIG. 4, the sealing means comprises a pair of flanges 90 and 92 depending from either side of crown 22. Flanges 90 and 92 are adapted to mate with a pair of flanges 94 and 96 upstanding from either side of bottom section 34. Depending flanges 90 and 92 and upstanding flanges 94 and 96 mate with sufficient tightness to seal the inclined surfaces and yet permit relative motion between crown 22 and center section 28. To improve the seal between the flanges, a wiper element 98 of any suitable material is disposed within channel 100 includes as part of depending flanges 90 and 92. Element 98 and channel 100 extend the length of flanges 90 and 92 in order to provide the greatest possible sealing effect.

Figure 6:
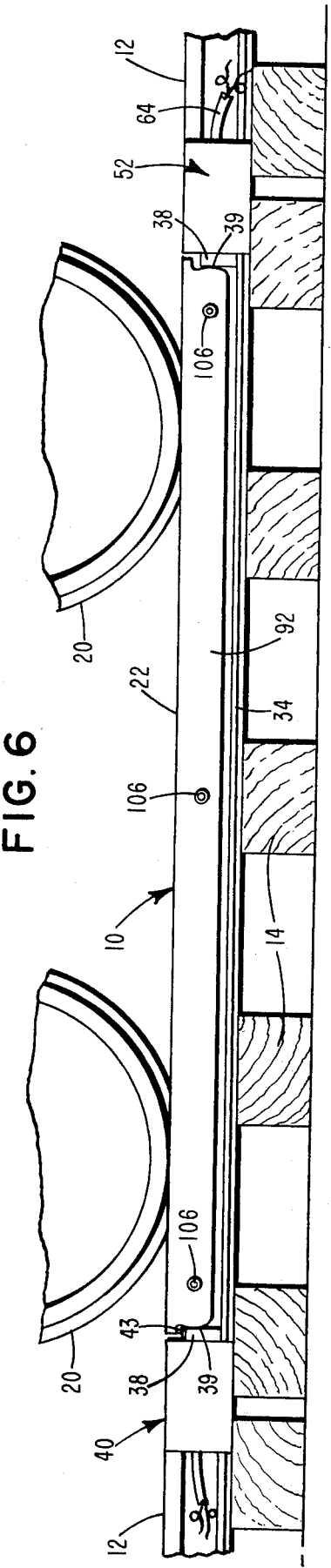
FIG. 6 is a view similar to FIG. 1 depicting the scale system in greater detail.

The locking means for crown 22 comprises a ball 102 disposed for movement within a vertical channel 104 included as part of upstanding flanges 94 and 96. A separate locking means is provided for each side of crown 22, although only one locking means at either side of crown 22 would be sufficient. As shown in FIG. 6, three such locking means are disposed along the length of crown 22, although the number and spacing of such locking means may be varied as desired. In order to retain ball 102 within channel 104, a removable set screw 106 is included as part of depending flanges 90 and 92. Set screw 106 includes an inner, concave portion 108 conforming generally to the radius of ball 102. By this construction, crown 22 is selectively removable from center section 28 or 72, and yet relative motion therebetween is unimpeded because of the rotatable nature of ball 102.

A restraining means in the form of leaf spring 70 is illustrated in FIG. 4. Leaf spring 70 is disposed intermediate the top of upstanding flanges 94 and 96 and the underside of crown 22. Only one such restraining means 70 could be employed, if desired, although two such restraining means tend to prevent tipping of crown 22 upon the application of a weight.

The alternative embodiment of scale system 10 illustrated in FIG. 3 is further illustrated in FIG. 5. The sealing means and locking means of this embodiment are identical in all respects to the sealing means and locking means of the first-mentioned embodiment and like reference numerals have been carried over from FIG. 4. Although FIG. 5 is drawn to a larger scale than FIG. 4, this is only for the purpose of showing the relationships between crown 22, center section 72, and bottom section 82 in greater detail. In use, all of the embodiments described herein would have the same outside dimensions so as to permit interchangeability with existing rail sections.

The scale system 10 of FIG. 1 is illustrated in greater detail in FIG. 6. In particular, it is seen that curved end portions 39 of flange 92 engage end sections 38 of bottom section 34 in order to permit substantially vertical displacement only of crown 22.

An installed, operative scale system is shown in FIG. 7. Each of the four scale systems 10 includes a sensing means 52 connected by lines 64 to a conventional interpreting means 66. Interpreting means 66 receives the signals sent by sensing means 52 and adds, records, and visually displays those signals in the form of an integrated readout indicative of the weight of the vehicle.

Figure 8:
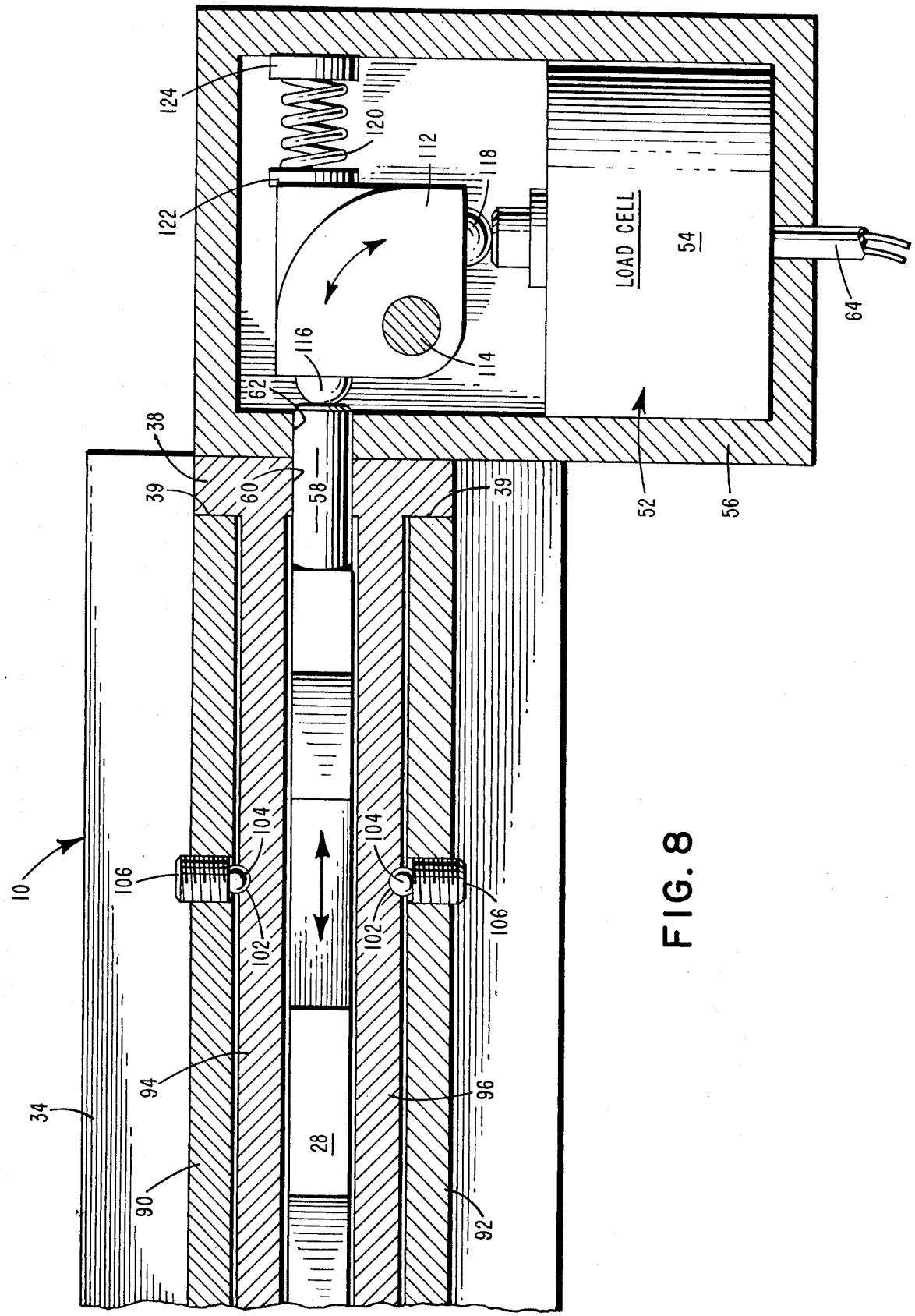
FIG. 8 is a plan view, partly in section, of a portion of one form of the invention showing a pivoted link for interconnecting the center section and the sensing means.

Sensing means 52 may be disposed in positions other than that illustrated in FIGS. 1, 2B, 6, and 7. As shown in FIG. 8, sensing means 52 extends to one side of crown 22. As in the other embodiments, sensing means 52 comprises a load cell 54 disposed in a generally rectangular housing 56. However, in order for load cell 54 to sense the displacment of center section 28, a pivoted link 112 is disposed intermediate load cell 54 and extended portion 58. Link 112 is pivotally mounted on a post 114 and includes rounded bearing surfaces 116 and 118 projecting therefrom. In this embodiment, an alternative restraining means also may be employed. This comprises coil spring 120 disposed intermediate boss 122 included as part of link 112 and boss 124 included as part of housing 56. Upon displacement of center section 28, spring 120 will be compressed to restrain the displacement of center section 28 and the pivoting of link 112. After the applied weight has been removed from crown 22, spring 120 will bias link 112 and center section 28 to their initial positions.

OPERATION

When it is desired to weight a vehicle such as car 16, the car is moved until each of the wheels 20 is resting on a portion of crown 22. When the weight is applied to crown 22, crown 22 is displaced substantially vertically downwardly due to the contraining effect of end portions 39 and end sections 38. In response to the displacement of crown 22, center section 28 or 72, as the case may be, is displaced substantially longitudinally only, due to the constraining influence of stationary bottom section 34 or 82, respectively. Thereafter, extended portion 58 engages load cell 54 included as part of sensing means 52. In turn, load cell 54 generates a signal which is transmitted through line 64 to interpreting means 66 as described previously.

If restraining means 40 is employed with scale system 10, electromagnet 42 remains operative to restrain the longitudinal displacement of center section 28 only until crown 22 engages switch 43. At that point, electromagnet 42 is deenergized and the displacement of center section 28 is unrestrained. However, after the weight applied to crown 22 is removed, switch 43 is closed, thus activating electromagnet 42, which in turn applies a force to extended portion 50 so as to return center section 28 to its initial position.

If another of the restraining means 68, 70, or 120 is employed, the displacement of center section 28 is continuously and progressively restrained. Of course, when the weight is removed from crown 22, any of restraining means 68, 70, or 120 operate to return center section 28 to its initial position. Under some conditions, however, it may be more desirable to have a more positive return of center section 28. This may be accomplished by employing restraining means 40 alone or in combination with any of the other restraining means herein described.

Unlike some conventional scale systems, the vertical displacement of crown 22 is kept to a minimum. By appropriately selecting the angles of the inclined surfaces, the system may be designed to provide an accurate reading with excellent precision and yet require only a minimal displacement of crown 22. This is advantageous because little interference occurs with respect to the movement of vehicles to be weighed and, additionally, reduces the shock and vibration transmitted to load cell 54.

The sealing means is very effective, partly because of the large overlap of the depending and upstanding flanges and partly because of wiper element 98. Regardless of existing weather conditions, center section 28 is always dry and the deterioration of the inclined surfaces is prevented. An additional benefit of the sealing means is that bearing members 36 are not exposed to the weather. Consequently, rusting or corrosion of the bearing members is prevented and their useful life is extended.

Scale system 10 has few moving parts, principally crown 22 and center section 28 or 72, as the case may be. This is a considerable advantage over prior art scales having many moving parts. Scale system 10 therefore is considerably cheaper to manufacture and, once in place, is practically maintenance-free. An additional benefit is that readings are consistently accurate and, particularly if a friction-reducing material is employed with the inclined surfaces, readings show considerably less variance than in prior art scales.

In the unlikely event that repairs are needed, access to the internal components of scale system 10 is easily had merely by removing set screws 106 and balls 102. Because all of the components are above-ground and because crown 22 may be removed so easily, the time and expense required to repair scale system 10 is decreased significantly over prior art scales.

It is apparent that scale system 10 could be installed on nonlevel ground, if desired. All that would be required would be an appropriate calibration of sensing means 52. Also, scale system 10 could be curved without affecting the accuracy or precision of the weight readings. Therefore, the scale system can be installed very close to wherever the vehicles are to be loaded or unloaded. The versatility of the scale system is such that it can be installed almost anywhere a conventional railroad track can be installed.

While several specific and preferred embodiments of the invention have been described, it will be obvious to those skilled in the art that changes and modifications may be made without departing from the invention. It is therefore intended in the appended claims to cover all such changes and modifications that fall within the true spirit and scope of the invention.

I claim:
1. A scale system, comprising:
   a. a crown vertically displaceable upon the application of a weight;
   b. a center section supporting said crown and constructed to be longitudinally displaceable upon vertical displacement of said crown;
   c. a sensing means actuated by said center section upon displacement of said center section for producing an output corresponding to the vertical displacement of said crown; and
   d. a bottom section supporting said center section.

2. The apparatus of claim 1, wherein said center section includes an extended portion, which extended portion engages said sensing means upon displacement of said center section.

3. The apparatus of claim 1, wherein said scale system additionally comprises a restraining means acting on said center section to restrain the displacement of said center section.

4. The apparatus of claim 3, wherein said restraining means comprises a leaf spring disposed intermediate a portion of said crown and a portion of said bottom section.

5. The apparatus of claim 3, wherein said restraining means comprises a coil spring horizontally disposed and acting on said center section.

6. The apparatus of claim 3, wherein said restraining means comprises and electromagnet.

7. The apparatus of claim 6, further comprising a switch actuated by said crown for selectively activating said electromagnet to return said center section to an initial position.

8. The apparatus of claim 1, wherein
   a. said crown comprises at least one downwardly facing inclined surface; and
   b. said center section includes at least one upwardly facing inclined surface slidably abutting said downwardly facing inclined surface, whereby said center section is longitudinally displaced upon vertical displacement of said crown.

9. The apparatus of claim 8, wherein a plurality of bearing members are interposed between said center section and said bottom section for facilitating substantially longitudinal displacement of said center section relative to said bottom section.

10. The apparatus of claim 9, further comprising means for constraining said crown at its ends for substantially vertical displacement only.

11. The apparatus of claim 8, wherein a friction-reducing material is provided for said inclined surfaces.

12. The apparatus of claim 11, wherein said friction-reducing material is polytetrafluoroethylene.

13. The apparatus of claim 11, wherein said friction-reducing material is of a composition which renders the coefficient of friction between said inclined surfaces substantially a constant.

14. The apparatus of claim 8, further comprising sealing means disposed in relation to said inclined surfaces so as to shield them from foreign matter to prevent deterioration of said inclined surfaces.

15. The apparatus of claim 14, wherein said sealing means comprises:
   a. flanges depending from the sides of said crown; and
   b. flanges upstanding from the sides of said bottom section, said depending and upstanding flanges mating with sufficient tightness to seal said inclined surfaces and yet permit relative motion between said crown and said center section.

16. The apparatus of claim 15, further comprising a leaf spring restraining means disposed intermediate said crown and at least one of said upstanding flanges.

17. The apparatus of claim 15, wherein a locking means is disposed intermediate said depending and upstanding flanges to permit selective removal of said crown from said center section.

18. The apparatus of claim 17, wherein said locking means comprises a ball disposed for movement in a vertical channel, said channel formed as part of one of said flanges.

19. The apparatus of claim 18, wherein said locking means includes a set screw as part of one of said depending flanges, said set screw removable to remove said ball from said channel and thereby unlock said crown from said center section.

20. The apparatus of claim 1, wherein
   a. said crown comprises at least one downwardly facing inclined surface;
   b. said center section includes at least one upwardly facing inclined surface slidably abutting said downwardly facing inclined surface of said crown;
   c. said bottom section comprises at least one upwardly facing inclined surface; and
   d. said center section also includes at least one downwardly facing inclined surface slidably abutting said upwardly facing inclined surface of said bottom section, whereby said center section is horizontally displaced relative to said bottom section upon vertical displacement of said crown.

21. The apparatus of claim 21, further comprising means for constraining said crown at its ends for substantially vertical displacement only.

22. The apparatus of claim 20, wherein a friction-reducing material is provided for said inclined surfaces.

23. The apparatus of claim 22, wherein said friction-reducing material is polytetrafluoroethylene.

24. The apparatus of claim 22, wherein said friction-reducing material is of a composition which renders the coefficient of friction between said inclined surfaces substantially a constant.

25. The apparatus of claim 20, wherein said scale system additionally comprises a restraining means acting on said center section to restrain the displacement of said center section.

26. The apparatus of claim 25, wherein said restraining means comprises a leaf spring disposed intermediate a portion of said crown and a portion of said bottom section.

27. The apparatus of claim 25, wherein said restraining means comprises a coil spring horizontally disposed and acting on said center section.

28. The apparatus of claim 25, wherein said restraining means comprises an electromagnet.

29. The apparatus of claim 28, further comprising a switch actuated by said crown for selectively activating said electromagnet to return said center section to an initial position.

30. The apparatus of claim 20, further comprising sealing means disposed in relation to said inclined surfaces so as to shield them from foreign matter to prevent deterioration of said inclined surfaces.

31. The apparatus of claim 30, wherein said sealing means comprises:
 a. flanges depending from the sides of said crown; and
 b. flanges upstanding from the sides of said bottom section, said depending and upstanding flanges mating with sufficient tightness to seal said inclined surfaces and yet permit relative motion between said crown and said center section.

32. The apparatus of claim 31, further comprising a leaf spring restraining means disposed intermediate said crown and at least one of said upstanding flanges.

33. The apparatus of claim 31, wherein a locking means is disposed intermediate said depending and upstanding flanges to permit selective removal of said crown from said center section.

34. The apparatus of claim 33, wherein said locking means comprises a ball disposed for movement in a vertical channel, said channel formed as part of one of said flanges.

35. The apparatus of claim 34, wherein said locking means includes a set screw as part of one of said depending flanges, said cover removable to remove said ball from said channel and thereby unlock said crown from said center section.

36. A rail scale system disposed entirely aboveground and adapted to replace existing rail structure, comprising:
 a. a crown vertically displaceable upon the application of a weight;
 b. a center section supporting said crown and constructed to be longitudinally displaceable upon vertical displacement of said crown;
 c. a bottom section supporting said center section, said bottom section adapted to replace an existing rail section and to be retained in place by conventional fittings; and
 d. a sensing means actuated by said center section upon displacement of said center section for producing an output corresponding to the vertical displacement of said crown.

37. The apparatus of claim 36, wherein said scale system additionally comprises a restraining means acting on said center section to restrain the displacement of said center section.

38. The apparatus of claim 37, wherein said restraining means comprises a leaf spring disposed intermediate a portion of said crown and a portion of said bottom section.

39. The apparatus of claim 37, wherein said restraining means comprises a coil spring horizontally disposed and acting on said center section.

40. The apparatus of claim 37, wherein said restraining means comprises an electromagnet.

41. The apparatus of claim 40, further comprising a switch actuated by said crown for selectively activating said electromagnet to return said center section to an initial position.

42. The apparatus of claim 36, wherein
 a. said crown comprises at least one downwardly facing inclined surface; and
 b. said center section includes at least one upwardly facing inclined surface slidably abutting said downwardly facing inclined surface, whereby said center section is longitudinally displaced upon vertical displacement of said crown.

43. The apparatus of claim 42, wherein a plurality of bearing members are interposed between said center section and said bottom section for facilitating substantially longitudinal displacement of said center section relative to said bottom section.

44. The apparatus of claim 43, further comprising means for constraining said crown at its ends for substantially vertical displacement only.

45. The apparatus of claim 42, wherein a friction-reducing material is provided for said inclined surfaces.

46. The apparatus of claim 45, wherein said friction-reducing material is polytetrafluoroethylene.

47. The apparatus of claim 45, wherein said friction-reducing material is of a composition which renders the coefficient of friction between said inclined surfaces substantially a constant.

48. The apparatus of claim 42, further comprising sealing means disposed in relation to said inclined surfaces so as to shield them from foreign matter to prevent deterioration of said inclined surfaces.

49. The apparatus of claim 48, wherein said sealing means comprises:
 a. flanges depending from the sides of said crown; and
 b. flanges upstanding from the sides of said bottom section, said depending and upstanding flanges mating with sufficient tightness to seal said inclined surfaces and yet permit relative motion between said crown and said center section.

50. The apparatus of claim 49, further comprising a leaf spring restraining means disposed intermediate said crown and at least one of said upstanding flanges.

51. The apparatus of claim 49, wherein a locking means is disposed intermediate said depending and upstanding flanges to permit selective removal of said crown from said center section.

52. The apparatus of claim 51, wherein said locking means comprises a ball disposed for movement in a vertical channel, said channel formed as part of one of said flanges.

53. The apparatus of claim 52, wherein said locking means includes a set screw as part of one of said depending flanges, said set screw removable to remove said ball from said channel and thereby unlock said crown from said center section.

* * * * *

UNITED STATES PATENT OFFICE
CERTIFICATE OF CORRECTION

Patent No. 3,993,149                    Dated   November 23, 1976

Inventor(s)  John E. Harvey

It is certified that error appears in the above-identified patent and that said Letters Patent are hereby corrected as shown below:

In the Specification, column 2, line 42 "this" should read -- thus --; line 67 "portion" should read -- system --. Column 4, line 65 "includes" should read -- included --. Column 5, line 57 "displacment" should read -- displacement --. Column 6, line 6 "weight" should read -- weigh --. In the Claims, claim 6, line 2 "and" should read -- an --. Claim 21, line 1 "21" should read -- 20 --.

Signed and Sealed this

Fifteenth Day of February 1977

[SEAL]

Attest:

RUTH C. MASON
Attesting Officer

C. MARSHALL DANN
Commissioner of Patents and Trademarks